(12) United States Patent
Regier (10) Patent No.: US 9,215,845 B2
(45) Date of Patent: Dec. 22, 2015

(54) AGGRESSIVE GRATE FOR COMBINE HARVESTER

(71) Applicant: AGCO Corporation, Duluth, GA (US)

(72) Inventor: Bernard D. Regier, Newton, KS (US)

(73) Assignee: AGCO Corporation, Duluth, GA (US)

( * ) Notice: Subject to any disclaimer, the term of this patent is extended or adjusted under 35 U.S.C. 154(b) by 139 days.

(21) Appl. No.: 14/031,600

(22) Filed: Sep. 19, 2013

(65) Prior Publication Data

US 2014/0087793 A1    Mar. 27, 2014

Related U.S. Application Data

(60) Provisional application No. 61/703,079, filed on Sep. 19, 2012.

(51) Int. Cl.
| | |
|---|---|
| *A01F 12/24* | (2006.01) |
| *A01F 12/44* | (2006.01) |
| *A01F 7/02* | (2006.01) |
| *A01F 12/22* | (2006.01) |
| *A01F 12/26* | (2006.01) |

(52) U.S. Cl.
CPC ............... *A01F 12/446* (2013.01); *A01F 7/02* (2013.01); *A01F 12/22* (2013.01); *A01F 12/26* (2013.01)

(58) Field of Classification Search
CPC ......... A01F 12/18; A01F 12/20; A01F 12/22; A01F 12/26
USPC .................................... 460/59, 107, 108, 110
See application file for complete search history.

(56) References Cited

U.S. PATENT DOCUMENTS

| | | | | |
|---|---|---|---|---|
| 3,334,744 | A * | 8/1967 | James et al. .................. | 209/394 |
| 3,385,438 | A * | 5/1968 | Fisher .......................... | 209/394 |
| 3,515,145 | A * | 6/1970 | Herbsthofer ................. | 460/110 |
| 4,875,891 | A * | 10/1989 | Turner et al. ................. | 460/110 |
| 4,988,326 | A * | 1/1991 | Bennett ........................ | 460/110 |
| 5,569,080 | A * | 10/1996 | Estes ............................ | 460/72 |
| 6,358,142 | B1 * | 3/2002 | Imel et al. .................... | 460/109 |
| 6,435,966 | B1 * | 8/2002 | Heidjann et al. ............. | 460/97 |
| 6,485,364 | B1 | 11/2002 | Gryspeerdt et al. | |
| 6,537,148 | B2 * | 3/2003 | Schwersmann .............. | 460/107 |
| 8,133,101 | B2 | 3/2012 | Regier et al. | |
| 2002/0005034 | A1 * | 1/2002 | Schwersmann ................ | 56/80 |
| 2005/0197176 | A1 * | 9/2005 | Foster et al. .................. | 460/108 |

* cited by examiner

*Primary Examiner* — Thomas B Will
*Assistant Examiner* — Mai Nguyen (57) ABSTRACT

A processing system for a combine harvester has a tubular rotor housing that concentrically receives a rotor used for threshing and separating crop materials. Concave and separator grate assemblies are arranged side-by-side axially along the processing system. Each grate assembly has laterally spaced apart side rails and a plurality of axial bars spanning the side rails. Each axial bar has a plurality of fingers extending therefrom toward an adjacent axial bar, the fingers defining apertures through which grain may pass. Each axial bar additionally has a plurality of disrupter walls placed between adjacent fingers, wherein an upper edge of each disrupter wall projects above the fingers on the same axial bar such that it is closer to the rotor to disrupt the axial flow of the crop material through the rotor housing.

5 Claims, 7 Drawing Sheets

AGGRESSIVE GRATE FOR COMBINE HARVESTER

RELATED APPLICATION

Under provisions of 35 U.S.C. §119(e), Applicants claim the benefit of U.S. Provisional Application No. 61/703,079 entitled AGGRESSIVE GRATE FOR COMBINE HARVESTER and filed Sep. 19, 2012, which is incorporated herein by reference.

BACKGROUND OF THE INVENTION

1. Field of Invention

This invention relates to crop harvesting machines of the type that use rotary processing devices, and more particularly to a rotary housing for the crop harvesting machine that provides a disrupted flowpath for the crop material as it moves axially through the processing system to permit more time for threshing and separation to take place.

2. Description of Related Art

In one type of processing system the crop travels axially parallel to and helically around the rotational axis of one or more rotary processing devices commonly referred to as rotors. In other systems, during at least a portion of its travel through the system the crop travels in a transverse or tangential direction relative to the rotational axis of a rotary processing device commonly referred to as a threshing cylinder. In each case, grain is processed between elements affixed to the periphery of the rotary device and arcuate, usually foraminous, stationary processing members in the form of threshing concaves or separating grates that partially wrap around the lower portion of the device.

Because processing systems are utilized to harvest a wide variety of different crops, it is at times desirable to disrupt the smooth flow of crop materials over the concaves and separator grates to prove the rotor more opportunity to thresh and separate the crop material.

Overview of the Invention

In one embodiment, the invention is directed to a processing system for a combine harvester having a tubular rotor housing that concentrically receives a rotor used for threshing and separating crop materials. Concave and separator grate assemblies are arranged side-by-side axially along the processing system. Each grate assembly has laterally spaced apart side rails and a plurality of axial bars spanning the side rails. Each axial bar has a plurality of fingers extending therefrom toward an adjacent axial bar, the fingers defining apertures through which grain may pass. Each axial bar additionally has a plurality of disrupter walls placed between adjacent fingers, wherein an upper edge of each disrupter wall projects above the fingers on the same axial bar such that it is closer to the rotor to disrupt the axial flow of the crop material through the rotor housing.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
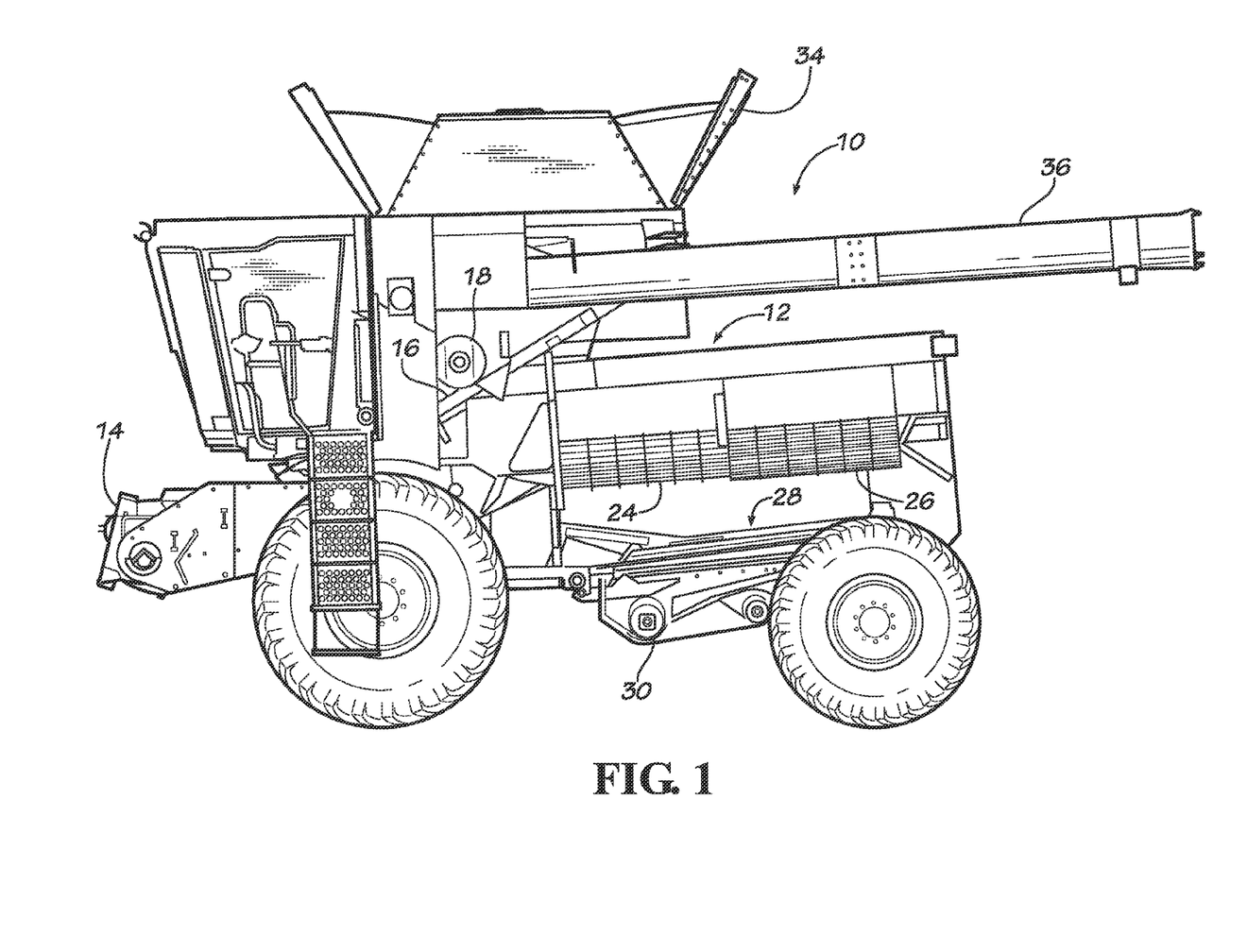
FIG. 1 is a schematic side elevational view of a combine harvester having a processing system utilizing axial flow and incorporating the principles of the present invention, portions of the harvester being broken away to reveal internal details of construction.

The exemplary combine harvester 10 selected for illustration in FIG. 1 has a single axial flow processing system 12 that extends generally parallel with the path of travel of the machine. However, as will be seen, the principles of the present invention are not limited to axial flow harvesters having only a single such processing system. For the sake of simplicity in explaining the principles of the present invention, this specification will proceed utilizing a single axial flow processing system as the primary example.

Figure 2:
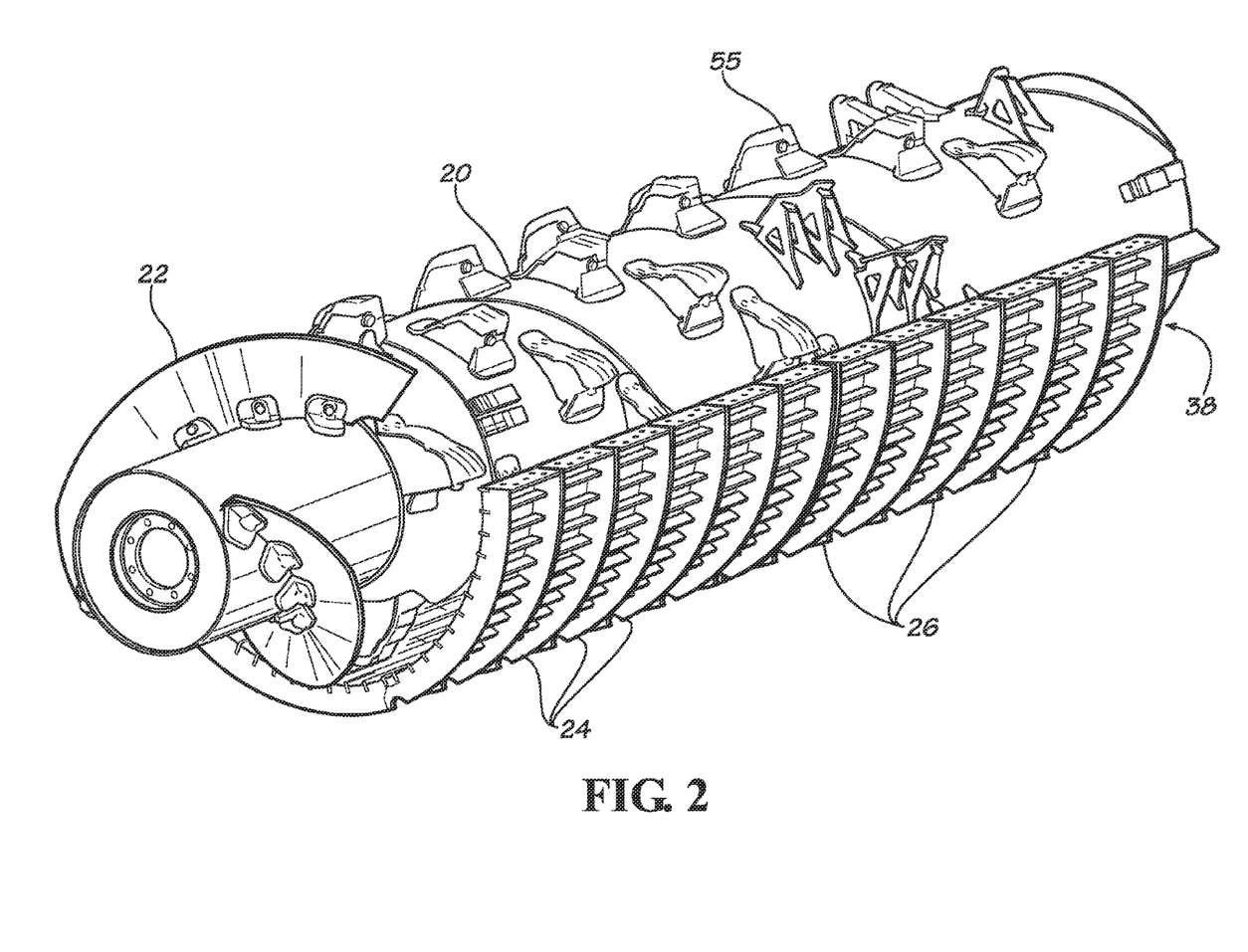
FIG. 2 is an enlarged isometric view of the processing system within the harvester of FIG. 1.

As well understood by those skilled in the art, in the illustrated embodiment combine harvester 10 includes a harvesting header (not shown) at the front of the machine that delivers collected crop materials to the front end of a feeder house 14. Such materials are moved rearwardly within feeder house 14 by a conveyer 16 until reaching the processing system 12. Turning now to FIG. 2, in the illustrated embodiment the processing system 12 has a rotor 20 having an infeed auger 22 on the front end thereof. The auger 22 and rotor 20 advance the materials axially through the processing system 12 for threshing and separating. In other types of systems, conveyor 16 may deliver the crop directly to a threshing cylinder.

Generally speaking, the crop materials entering processing system 12 move axially and helically therethrough during threshing and separating. During such travel the crop materials are threshed and separated by rotor 20 operating in cooperation with preferably foraminous separator 23 in comprising at least one threshing concave grate assembly 24 and separator grate assembly 26, with the grain escaping laterally through concave grate assemblies 24 and separator grate assemblies 26 into cleaning mechanism 28 (FIG. 1). Bulkier stalk and leaf materials are retained by concave grate assemblies 24 and separator grate assemblies 26 and are passed out the rear of processing system 12 and ultimately out of the rear of the harvester 10. A blower (not shown) forms part of the cleaning mechanism 28 and provides a stream of air throughout the cleaning region below processing system 12 and directed out the rear of the harvester 10 so as to carry lighter chaff particles away from the grain as it migrates downwardly toward the bottom of the machine to a clean grain auger 30. Auger 30 delivers the clean grain to an elevator (not shown) that elevates the grain to a storage bin 34 on top of the machine, from which it is ultimately unloaded via an unloading spout 36.

The plurality of concave grate assemblies 24 and separator grate assemblies 26 are arranged side-by-side axially along the processing system 12 to form a part of what may be considered a tubular housing 38 that concentrically receives rotor 20 and serves as part of processing system 12. In the illustrated embodiment, six concave grate assemblies 24 and three separator grate assemblies 26 form part of the tubular housing 38. However, one skilled in the art will understand that more or fewer concave grate assemblies 24 and separator grate assemblies 26 may be used in the tubular housing 38. As is known in the art, the tubular housing 38 includes a convex top wall (not shown) that extends the full length of housing 38 and effectively closes off the top portion thereof from front to rear. The concave grate assemblies 24 and separator grate assemblies 26 are moved adjustably toward and away from rotor 20 to adjust the running clearance between the rotor 20 and concave and separator grate assemblies 24, 26 and to change the shape of the threshing and separating regions as is known in the art and need to be further discussed herein.

Figure 3:
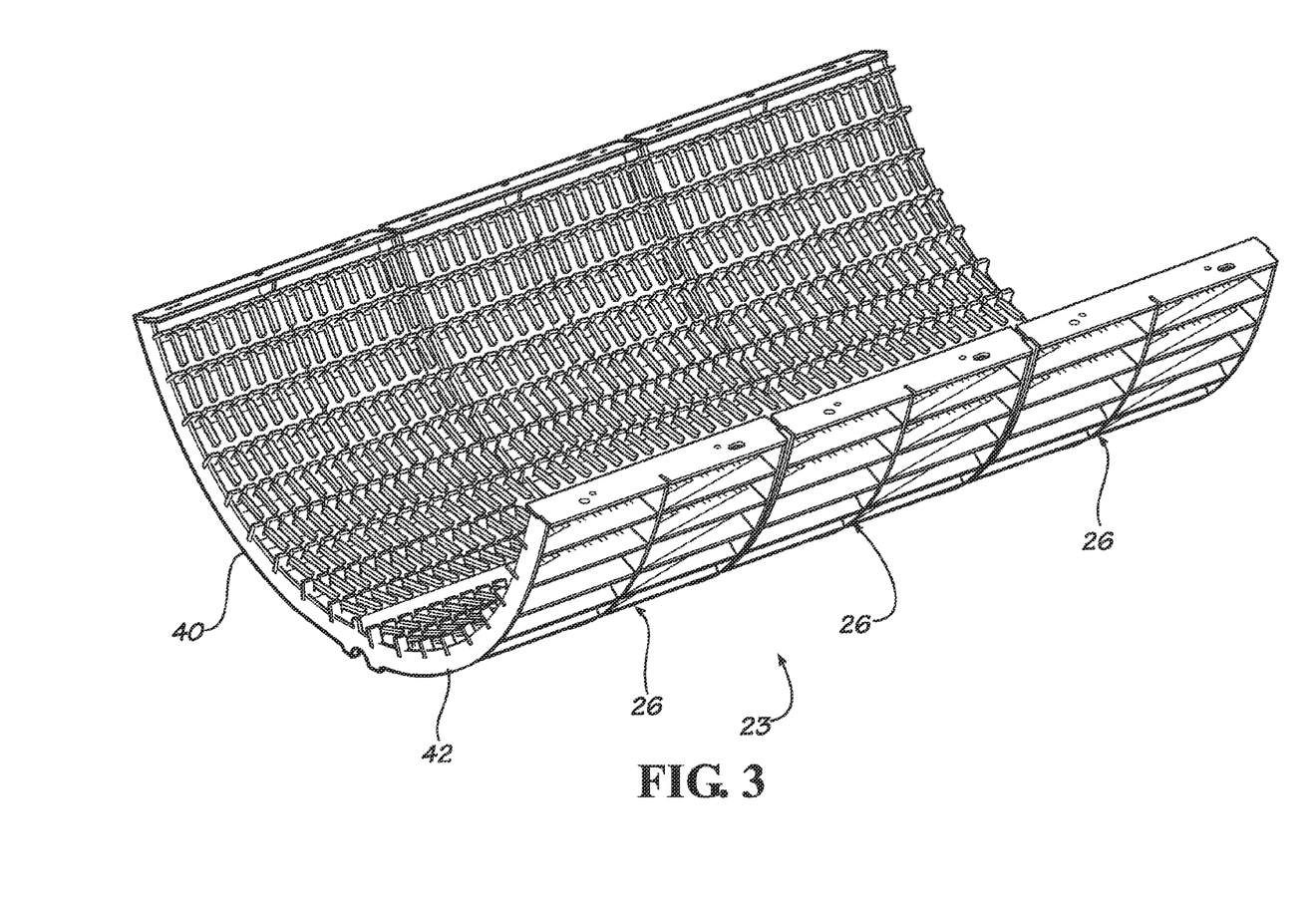
FIG. 3 is an enlarged isometric view of a portion of the processing system of FIG. 2 showing separator grate and concave grate assemblies.

As best seen in FIG. 3, each separator grate assembly 26 includes an arcuate first grate 40 and an arcuate second grate 42 pivotally mounted in the processing system 12. A suitable actuator (not shown) is located near the processing system 12 and mounted on portions of the combine harvester frame structure. Preferably, the actuator is remotely operable, such as from the cab of harvester 10. In one preferred embodiment, the actuator comprises an electrically powered linear actuator. It will be appreciated, however, that actuator could comprise a number of different devices, such as a hydraulic cylinder or a turnbuckle, for example. Grates 50 and 52 of each separator grate assembly 26 desirably have substantially similar structure but mirror images, so only grate 40 will be described in detail herein. Additionally, the invention is described herein with respect to a grate of the separator grate assembly, but one skilled in the art will understand that the invention may also be used in a concave grate assembly 24 without departing from the scope of the invention.

Figure 4:
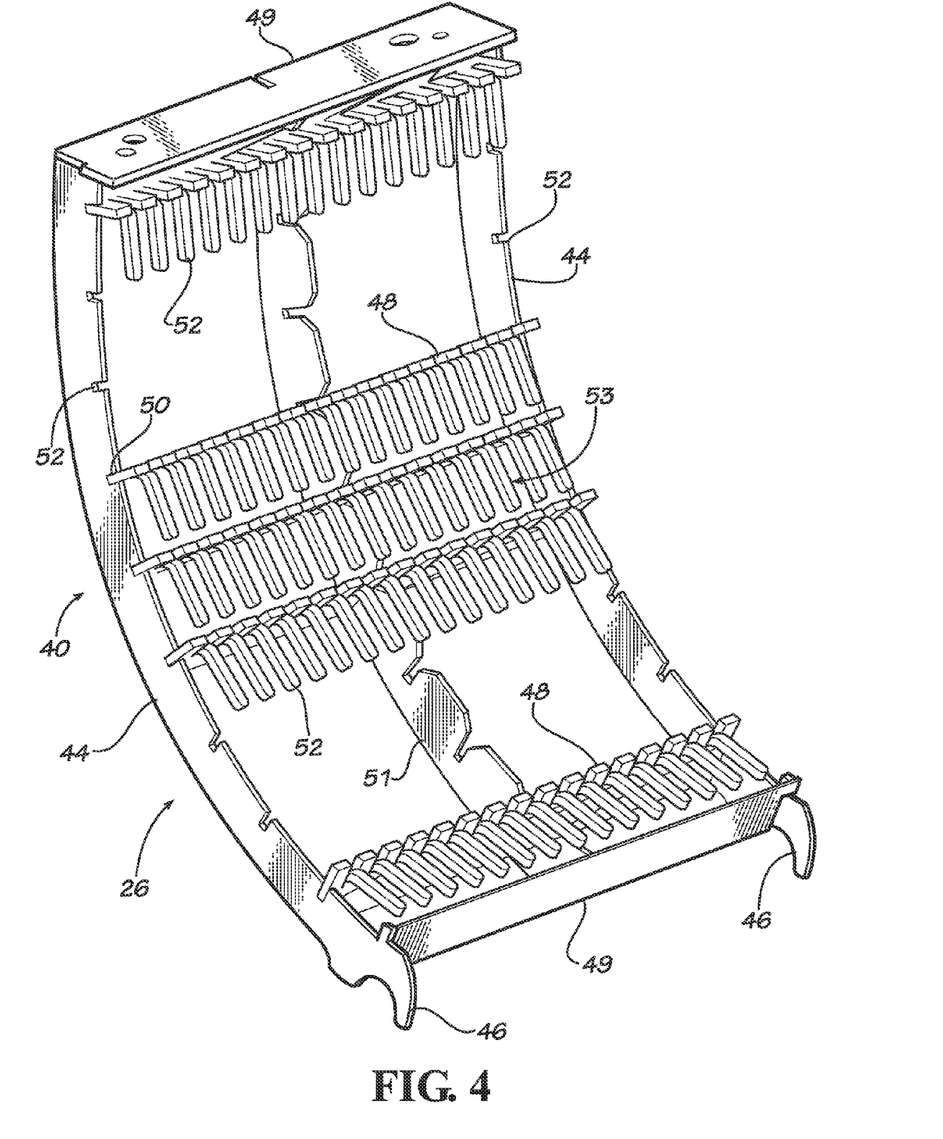
FIG. 4 is a partially cut away view of one of the separator grate assemblies of FIG. 3.

Turning now to FIG. 4, it will be seen that the grate 40 includes a pair of arcuate, elongated and laterally spaced apart side rails 44 oriented generally transverse to the axis of the rotor 20. One end of each side rail 44 has a hook 46 used to mount the separator grate assembly 26 on an axial bar (not shown) used to move the separator grate 26 toward or away from the rotor 20. A plurality of axial bars 48 span the side rails 44. End plates 49 are desirably affixed between ends of the side rails 44. The axial bars 48 have outwardly projecting overhangs 50 at their opposite ends that overlay upper edges of the side rails 44 and are operable to bear against the same when grate 40 is installed. Desirably, the overhangs 50 are received in notches 52 in the upper edges of side rails 44 and welded to the side rails 46. Overhangs 50 also provide a substantially continuous surface when multiple grate assemblies 26 are installed side-by-side in the harvester 10. Desirably, one or more middle supports 51 are positioned between and parallel to the side rails 44 and support the axial bars 48.

Figure 6:
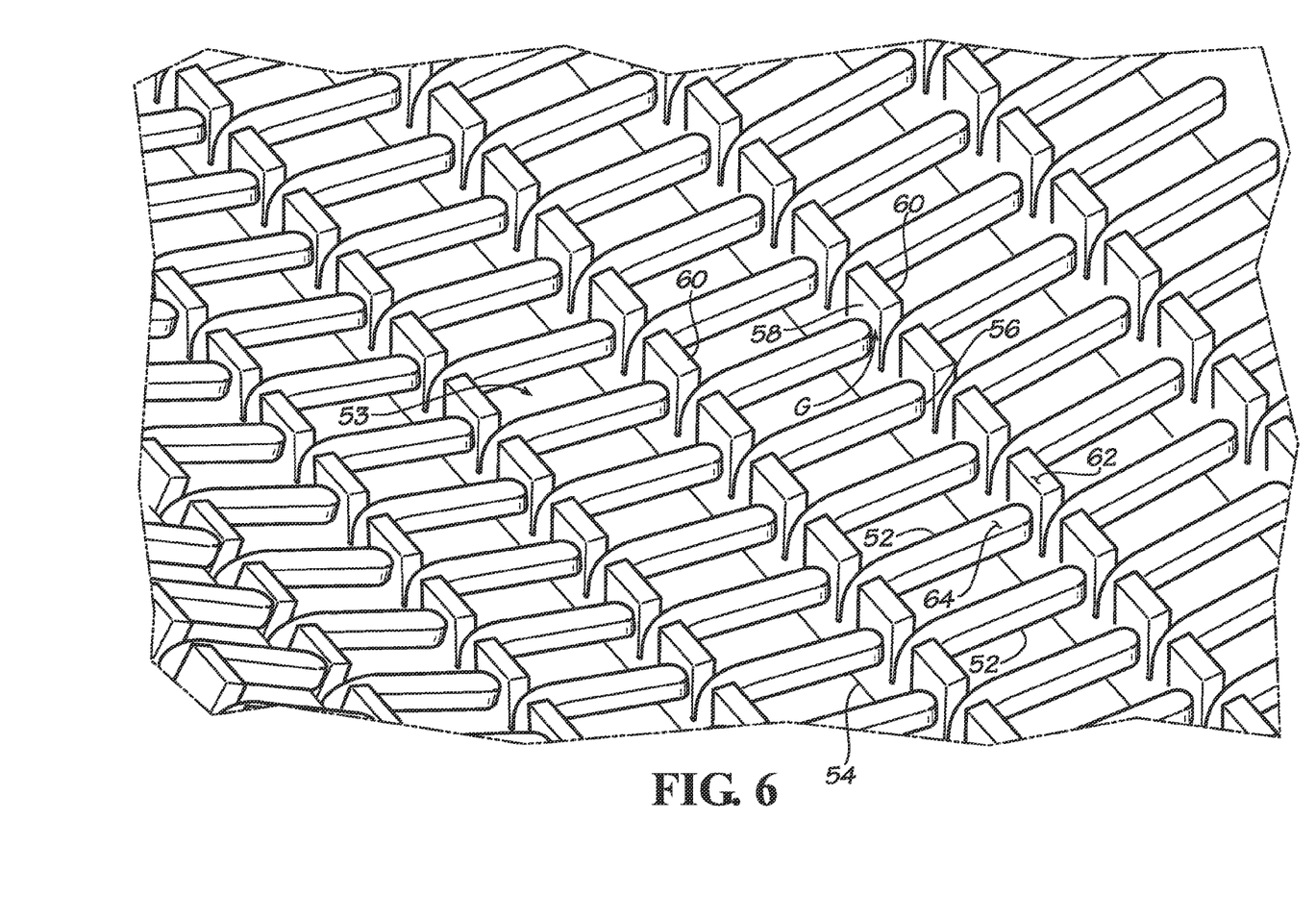
FIG. 6 is an enlarged view of a portion of one the separator grate assemblies of FIG. 3.
Figure 7:
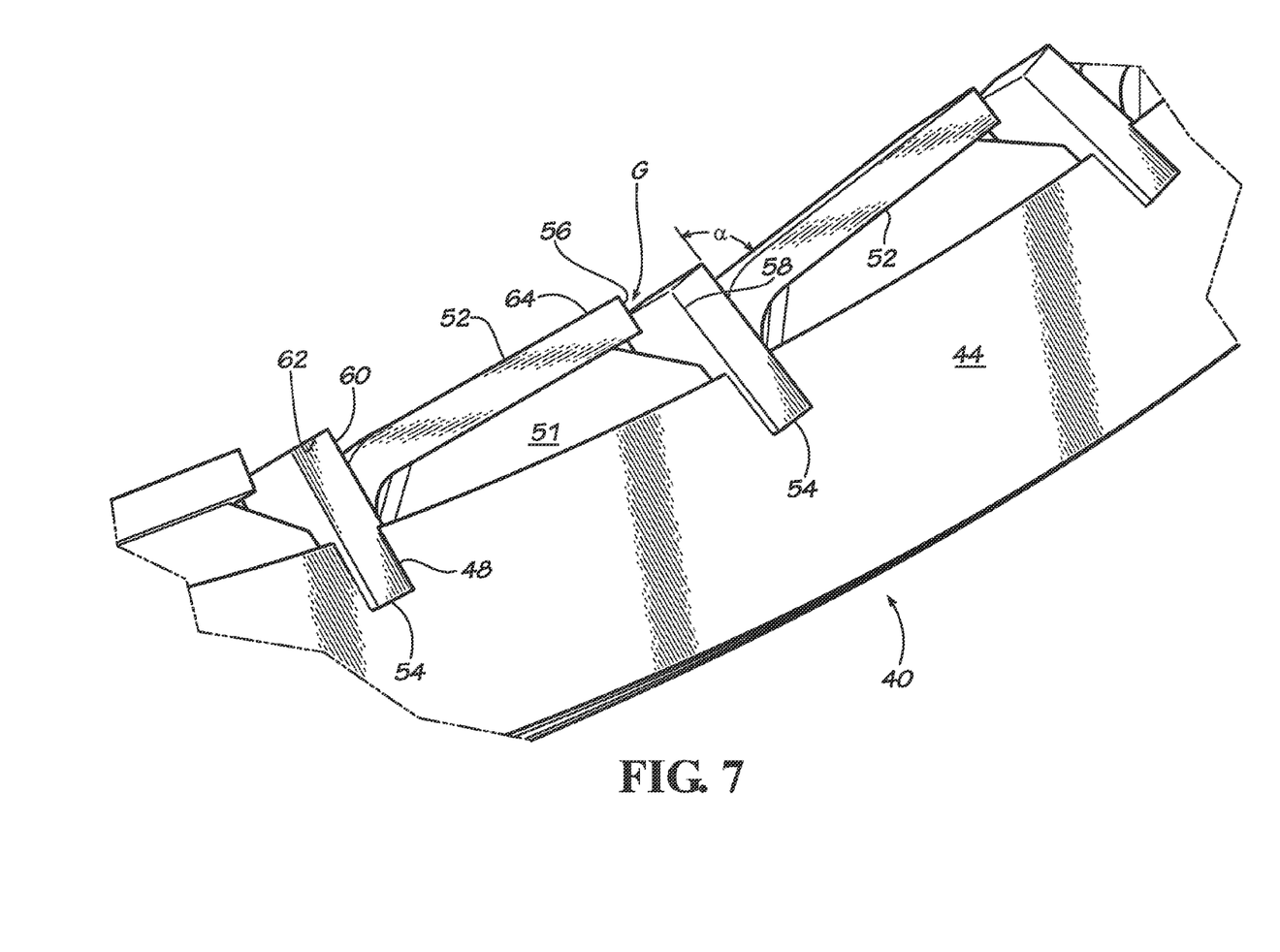
FIG. 7 is an enlarged side view of a portion of one the separator grate assemblies shown in FIG. 6.

Each axial bar 48 has a plurality fingers 52 extending from the base portion 54 of the axial bar. The fingers 52 are elongate members that spaced along the base portion 54 so as to form apertures between adjacent fingers 52 through which grain may pass. Thus, the fingers 52 form a separating surface 53 that cooperates with rasp-like elements 55 (FIG. 2) on the rotating rotor 20 to separate the grain from cobs, husks, and other crop materials passing through the processing system. In the illustrated embodiment, the fingers 52 extend away from the base portion 54 so they point in the same direction as the direction of rotation of the rotor 20 and have an axis that is generally perpendicular with the base portion 54. However, one skilled in the art will understand that the fingers 52 may extend from opposing sides of the axial bars 48 such that each axial bar has fingers extending in opposite directions. As best seen in FIGS. 6 and 7, the fingers 52 extend away from the base portion 54 of the axial bar 48 toward the adjacent axial bar, but do not contact the adjacent axial bar. A small gap G is left between tip 56 of each finger 52 and a rear surface 58 of the base portion 54 of the adjacent axial bar 48. Desirably gap G has a distance between about 0.2 and 1.0 inches (0.5 and 2.5 cm). Desirably, the axis of each finger 52 is substantially perpendicular to the base portion 54, but may extend from the base portion 54 at an angle α of between about 70 and 110 degrees. Without being limited by any explanation, it is believed that the gaps G between the fingers 52 on one axial bar 48 and the adjacent axial bar help prevent the stalk and stem trash from getting caught and accumulating in the separating surface 53 of the grate 40.

Figure 5:
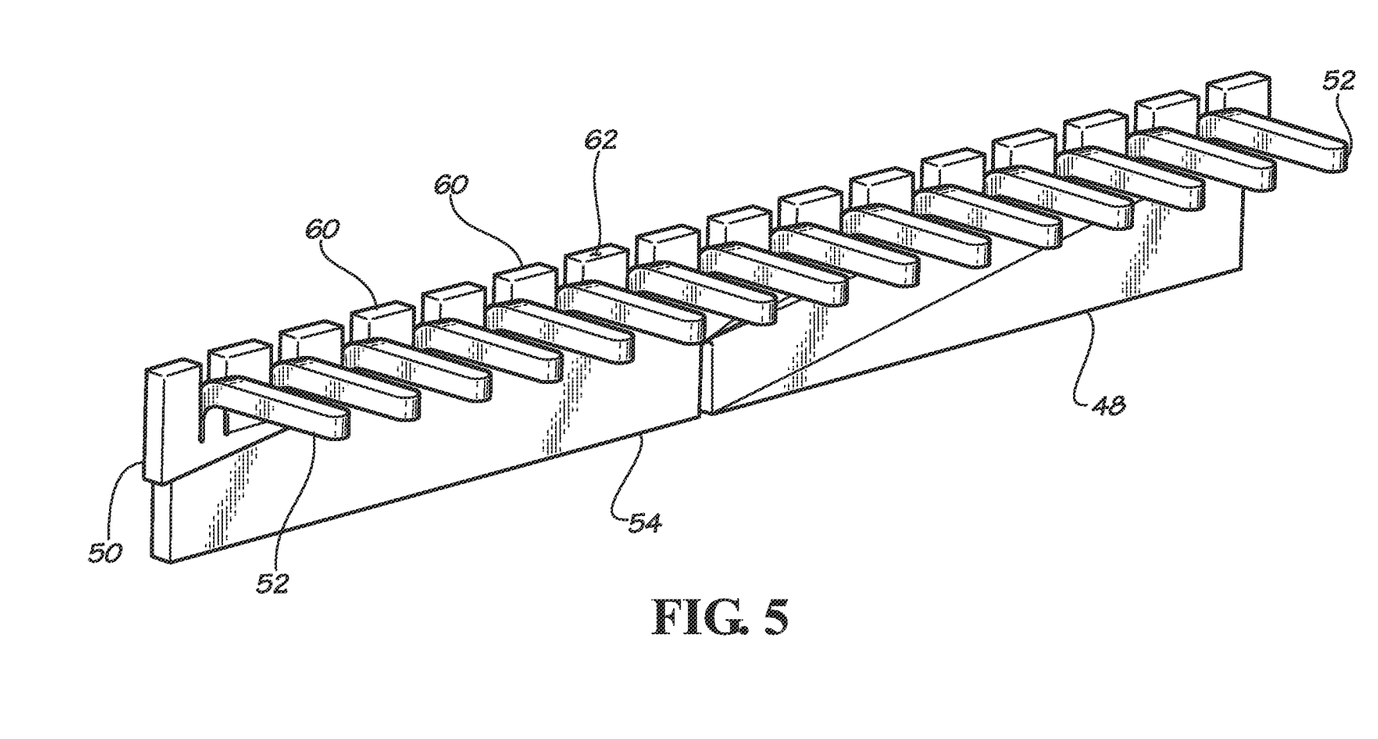
FIG. 5 is an enlarged isometric view of an axial bar of the separator grate assembly of FIG. 4.

According to the invention, the base portion 54 has a plurality of disrupter walls 60 extending upward toward the rotor 20. As best seen in FIG. 5, desirably there is an upward extending disrupter wall 60 on the axial bar 48 between the base of adjacent fingers 52. The upper edge 62 of the disrupter walls projects above the fingers 52 of the axial bars 48 and is believed to provide a more aggressive flowpath for the crop material as it moves axially through the processing system 12 over the grate assemblies 26. As best seen in FIG. 7, because of the arcuate shape of the grate 40, the upper surface 64 of the tips 56 of fingers 52 is slightly elevated above the upper edge 62 of the disrupter walls 60 of the next adjacent axial bar 48.

In operation, the rotor 20 rotates in a clockwise direction as viewed from the rear of the harvester 10. Thus, as crop materials are introduced into the front end of processing system 12, they move helically within and about rotor housing 38 in a counterclockwise direction as FIG. 2 is viewed. The threshing and separating action occurs in a region located generally in the bottom half of the processing system 12, between the periphery of rotor 20 and concave and separating grate assemblies 24, 26. The disrupter walls 60 slow the axial flow of the crop material through the processing system 12 to permit the more time for separation to take place.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A processing system for a combine harvester having a tubular rotor housing that concentrically receives a rotor used for threshing and separating grain in crop materials, the processing system comprising a plurality of grate assemblies arranged side-by-side axially along the processing system through which threshed grain may pass, each grate assembly comprising laterally spaced apart side rails and a plurality of axial bars spanning said side rails, wherein each axial bar has base portion with a plurality of fingers extending from the base portion toward an adjacent axial bar but not contacting said adjacent axial bar such that a gap is left between a tip of each finger and a rear surface of the adjacent axial bar, said fingers defining apertures through which grain may pass, and wherein the base portion of each axial bar has a plurality of disrupter walls extending from the base portion between adjacent fingers toward said rotor such that adjacent disrupter walls on each base portion are laterally spaced from each other by an intervening finger, wherein upper edges of the plurality of disrupter walls project above adjacent upper surfaces of the intervening fingers on the same axial bar such that said upper edges are closer to the rotor to disrupt the axial flow of the crop material through the rotor housing but allow the crop material to pass between adjacent disrupter walls on each axial bar over said plurality of intervening fingers.

2. The processing system for a combine harvester of claim 1 wherein said plurality fingers extend from the base portion of said axial bar, said fingers extending away from the base portion so as to point in the same direction as the direction of rotation of the rotor and have an axis that is generally perpendicular with the base portion.

3. The processing system for a combine harvester of claim 1 wherein the gap has a distance between about 0.2 and 1.0 inches (0.5 and 2.5 cm).

4. The processing system for a combine harvester of claim 1 wherein the upper surface at the tip of each finger is elevated above the upper edge of the disrupter walls of the next adjacent axial bar.

5. The processing system for a combine harvester of claim 1 wherein said plurality fingers extend from the base portion of said axial bar, said fingers extending away from the base portion at an angle of between about 70 and 110 degrees.

* * * * *